(12) United States Patent
Pei et al.

(10) Patent No.: US 11,168,748 B2
(45) Date of Patent: Nov. 9, 2021

(54) ELECTROMAGNETIC JAW CLUTCH

(71) Applicant: Jing-Jin Electric Technologies Co., Ltd., Beijing (CN)

(72) Inventors: Zhengqiang Pei, Beijing (CN); Ping Yu, Beijing (CN); Xueliang Wang, Beijing (CN); Jianwen Li, Beijing (CN); Chouwu Qiu, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 0 days.

(21) Appl. No.: 15/733,640

(22) PCT Filed: Jan. 3, 2019

(86) PCT No.: PCT/CN2019/070222
§ 371 (c)(1),
(2) Date: Sep. 22, 2020

(87) PCT Pub. No.: WO2019/184544
PCT Pub. Date: Oct. 3, 2019

(65) Prior Publication Data
US 2021/0010543 A1 Jan. 14, 2021

(30) Foreign Application Priority Data

Mar. 26, 2018 (CN) .......................... 201810252107.3

(51) Int. Cl.
*F16D 27/14* (2006.01)
*F16D 27/118* (2006.01)
(Continued)

(52) U.S. Cl.
CPC ............ *F16D 27/14* (2013.01); *F16D 27/118* (2013.01); *F16D 2027/007* (2013.01); *F16D 2121/20* (2013.01); *F16D 2500/1022* (2013.01)

(58) Field of Classification Search
CPC .. F16D 27/14; F16D 27/118; F16D 2027/007; F16D 2121/20; F16D 2500/1022
See application file for complete search history.

(56) References Cited

FOREIGN PATENT DOCUMENTS

| CN | 103758889 A | 4/2014 |
|---|---|---|
| CN | 203822903 U | 9/2014 |

(Continued)

*Primary Examiner* — Huan Le
(74) *Attorney, Agent, or Firm* — LKGlobal | Lorenz & Kopf, LLP

(57) ABSTRACT

The present disclosure relates to the technical field of clutches, and particularly relates to an electromagnetic jaw clutch. The electromagnetic jaw clutch includes a movable gear sleeve and a fixed gear sleeve that are in engagement transmission, a fixed armature is nested to an outer side of the fixed gear sleeve, the fixed armature and the fixed gear sleeve have a gap therebetween, and have a fixed position, a solenoid is provided inside the fixed armature, a movable armature is rotatably nested to an outer side of the movable gear sleeve, the movable armature is movable along with the movable gear sleeve in an axial direction, and when the solenoid is electrified, the solenoid attracts the movable armature to the fixed armature, to cause the movable gear sleeve and the fixed gear sleeve to be engaged. The present disclosure provides an electromagnetic clutching system that has a compact structure, has no auxiliary executing structure and can be conveniently operated, which can be applied to electrically driving systems of new-energy vehicles. The system controls the transmission and disconnection of power torque.

8 Claims, 2 Drawing Sheets

(51) Int. Cl.
    *F16D 27/00*     (2006.01)
    *F16D 121/20*     (2012.01)

(56) References Cited

FOREIGN PATENT DOCUMENTS

| | | | |
|---|---|---|---|
| CN | 204921772 U | 12/2015 | |
| CN | 205841559 U | 12/2016 | |
| CN | 108443353 A | 8/2018 | |
| CN | 208236944 U | 12/2018 | |
| EP | 0475504 A2 * | 3/1992 | ............ F16D 27/118 |
| EP | 0475504 A2 | 3/1992 | |
| GB | 2006894 B | 5/1982 | |
| WO | 2017193636 A1 | 11/2017 | |
| WO | 2020187180 A1 | 9/2020 | |

\* cited by examiner

ELECTROMAGNETIC JAW CLUTCH

CROSS-REFERENCE TO RELATED APPLICATION

This Application is a U.S. National-Stage entry under 35 U.S.C. § 371 based on International Application No. PCT/CN2019/070222, filed Jan. 3, 2019, which was published under PCT Article 21(2) and which claims priority to Chinese Application No. 201810252107.3, filed Mar. 26, 2018, which are all hereby incorporated herein in their entirety by reference.

TECHNICAL FIELD

This Application pertains to the technical field of clutches, and particularly relates to an electromagnetic jaw clutch.

BACKGROUND

The electrically driving systems of new-energy vehicles, in order to realize the switching between different operation modes, are required to use a power on-off mechanism. Traditional clutches comprise a pressure-plate assembly, a driven disc, a diaphragm spring, a release bearing, a rocker arm, a resistance mechanism and so on, so they involve many component parts, have a high weight, have many fail points, and are difficult to maintain.

In conventional electromagnetic-clutch systems that are applied to electrically driving systems of new-energy vehicles, because the movable gear sleeve and the movable armature are fixed and integrated, when the solenoid is electrified, the movable gear sleeve and the fixed gear sleeve are engaged, and they rotate synchronously and transmit torque. At this point, it is required that the fixed armature and the movable armature must not contact; or else they may have mutual friction, which results in damage. Such a structure results in two potential problems. One is that the electromagnetic force has to be borne by the bearings mounted on the shafts inside the movable/fixed gear sleeve, which increases the load of the bearings. The other is that the gap between the fixed armature and the movable armature cannot be easily controlled.

If in the disengaged state the gap between the movable armature and the fixed armature is too big, the electromagnetic attraction force is insufficient. On the contrary, if in the disengaged state the gap between the movable armature and the fixed armature is too small, when attracted, the movable armature and the fixed armature may easily contact, which results in the frictional damage, and the fixed armature and the movable armature, when abutted, cannot be disengaged due to remanence, which affects the efficiency and the reliability of the system. In addition, other objects, desirable features and characteristics will become apparent from the subsequent summary and detailed description, and the appended claims, taken in conjunction with the accompanying drawings and this background.

SUMMARY

Aiming at the above problems, an object of the present disclosure is to provide an electromagnetic jaw clutch, to solve the problems of the conventional clutches that when the movable gear sleeve and the fixed gear sleeve are disengaged, the attraction force is insufficient due to a too big gap, and when the movable gear sleeve and the fixed gear sleeve are attracted, a too small gap results in that the fixed armature and the movable armature, when they are abutted, cannot be disengaged due to remanence and mutual friction between them results in damage.

In order to achieve the above objects, the present disclosure employs the following technical solutions:

an electromagnetic jaw clutch, comprising a movable gear sleeve and a fixed gear sleeve that are in engagement transmission, wherein a fixed armature is nested to an outer side of the fixed gear sleeve, the fixed armature and the fixed gear sleeve have a gap therebetween, and have a fixed position, a solenoid is provided inside the fixed armature, a movable armature is rotatably nested to an outer side of the movable gear sleeve, the movable armature is movable along with the movable gear sleeve in an axial direction, and when the solenoid is electrified, the solenoid attracts the movable armature to the fixed armature, to cause the movable gear sleeve and the fixed gear sleeve to be engaged.

Preferably, a bearing is nested to an outer circumference of the movable gear sleeve, the bearing is embedded inside a bearing seat, the movable armature is connected to the bearing seat, and the bearing seat or the movable armature is provided with a positioning surface at a rear end.

Preferably, the movable gear sleeve and the fixed gear sleeve are nested to a first shaft and a second shaft respectively via a spline, the movable gear sleeve is movable in an axis direction of the first shaft, a first end cap and a second end cap are respectively provided at outer sides of the first shaft and the second shaft, and the positioning surface of the bearing seat is positioned and abuts the first end cap.

Preferably, a front end of the first end cap is a vertical plane that cooperates with the positioning surface of the bearing seat or the movable armature.

Preferably, the first shaft is provided with a shaft pressing plate at a front end, and the shaft pressing plate is connected to the movable gear sleeve via a spring; and when the solenoid is powered off, a spring force of the spring causes the movable gear sleeve and the fixed gear sleeve to be disengaged.

Preferably, the height of the positioning surface at the rear end of the bearing seat is configured so that the gap between the movable armature and the fixed armature when disengaged is in a range of 2-8 mm.

Preferably, the fixed armature is provided with a cushioning component at an end face or an outer circumference for, when the fixed armature is attracted to the movable armature, serving to cushion and leaving a gap between the fixed armature and the movable armature.

Preferably, the cushioning component is a cushioning gasket provided on the end face or the outer circumference of the fixed armature, or a plurality of cushioning blocks provided circumferentially on the end face or the outer circumference of the fixed armature.

Preferably, a height of the cushioning component is configured so that the gap between the movable armature and the fixed armature when attracted is in a range of 0.1-1.5 mm.

Preferably, both of the movable gear sleeve and the fixed gear sleeve are provided with contrate teeth, and when the movable gear sleeve and the fixed gear sleeve are engaged, addenda and dedendal of the contrate teeth have a gap therebetween, and moment transmission is realized by contact between tooth sides.

The advantages and advantageous effects of the present disclosure are as follows. The present disclosure can be applied to electrically driving systems of new-energy vehicles. The present disclosure provides an electromagnetic clutching system that has a compact structure, has no auxiliary executing structure and can be conveniently operated. The system controls the transmission and disconnection of power torque.

The present disclosure, by the accurate positioning between the movable armature and the end caps, enables the gap between the two armatures when the clutch is disengaged to be in a preset range, which guarantees that the clutch has a sufficient attraction force in clutch attraction, to realize quick attraction.

In the present disclosure, the cushioning gasket is provided at the end face of the fixed armature. In the attraction by the electromagnetic force, the cushioning gasket is firstly compressed, to serve to cushion, which significantly reduces the noise of the structure. Moreover, the cushioning gasket guarantees that the fixed armature and the movable armature have a certain gap therebetween when the fixed gear sleeve and the movable gear sleeve are engaged, which prevents that the fixed armature and the movable armature, when abutted, cannot be disengaged due to remanence.

In the present disclosure, in clutch attraction, the cushioning gasket on the fixed armature and the movable armature are closely abutted, and the movable armature and the fixed armature do not have relative rotation therebetween, which prevents the problem of mutual friction.

In the present disclosure, in clutch attraction, the fixed gear sleeve and the movable gear sleeve are engaged, rotate synchronously, and transmit torque, and at this point, merely the tooth sides of the fixed-gear-sleeve contrate teeth and the movable-gear-sleeve contrate teeth are in contact, and the dedendal and the addenda are not in contact, which can prevent extra axial load generated by the electromagnetic force from acting on the first shaft and the second shaft, and reduce the load on the bearings on the two shafts.

BRIEF DESCRIPTION OF THE DRAWINGS

The present invention will hereinafter be described in conjunction with the following drawing figures, wherein like numerals denote like elements, and.

Figure 1:
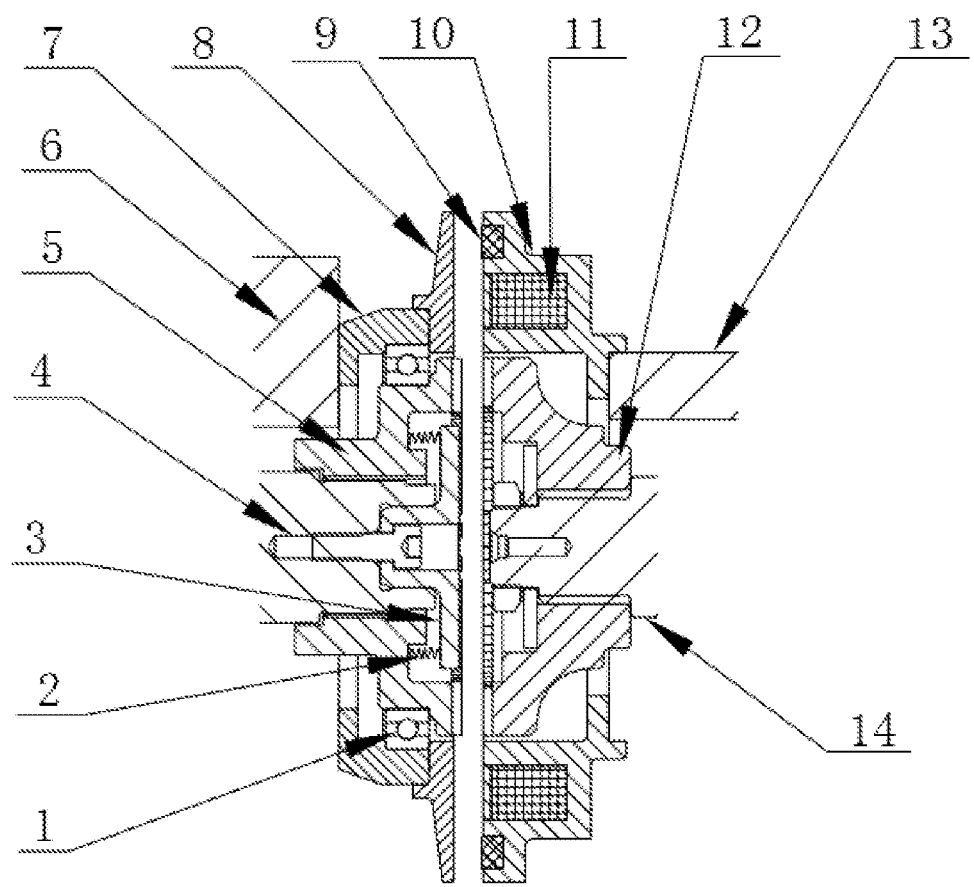
FIG. 1 is a schematic structural diagram according to the present disclosure.

In the drawings: 1 is the bearing, 2 is the spring, 3 is the shaft pressing plate, 4 is the first shaft, 5 is the movable gear sleeve, 501 is the movable-gear-sleeve contrate teeth, 6 is the first end cap, 7 is the bearing seat, 8 is the movable armature, 9 is the cushioning gasket, 10 is the fixed armature, 11 is the solenoid, 12 is the fixed gear sleeve, 121 is the contrate teeth of the fixed gear sleeve, and 13 is the second end cap.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Traditional clutches comprise a pressure-plate assembly, a driven disc, a diaphragm spring, a release bearing, a rocker arm, a resistance mechanism and so on, so they involve many component parts, have a high weight, have many failpoints, and are difficult to maintain.

In order to solve the problems of the conventional clutches of insufficient attraction force and mutual friction between the fixed armature and the movable armature, the present disclosure, by the accurate positioning between the movable armature and the end caps, enables the gap between the two armatures when the clutch is disengaged to be in a preset range, which guarantees that the clutch has a sufficient attraction force in clutch attraction, to realize quick attraction.

In order to make the objects, the technical solutions and the advantages of the present disclosure clearer, the present disclosure will be described below in detail in conjunction with the drawings and the particular embodiments.

As shown in FIG. 1, an electromagnetic jaw clutch according to the present disclosure comprises a movable gear sleeve 5 and a fixed gear sleeve 12 that are in engagement transmission, a fixed armature 10 is nested to the outer side of the fixed gear sleeve 12, the fixed armature 10 and the fixed gear sleeve 12 have a gap therebetween, and have a fixed position, a solenoid 11 is provided inside the fixed armature 10, a movable armature 8 is rotatably nested to the outer side of the movable gear sleeve 5, the movable armature 8 is movable along with the movable gear sleeve 5 in an axial direction, and when the solenoid 11 is electrified, the solenoid 11 attracts the movable armature 8 to the fixed armature 10, to cause the movable gear sleeve 5 and the fixed gear sleeve 12 to be engaged.

The movable gear sleeve 5 is nested to a first shaft 4 via a spline, the movable gear sleeve 5 is movable in the axis direction of the first shaft 4, and the movable gear sleeve 5 is circumferentially fixed to the first shaft 4. In other words, the movable gear sleeve 5 is connected to the first shaft 4, and they have relative sliding therebetween, and do not have relative rotation therebetween. A first end cap 6 is provided on the outer side of the first shaft 4. The fixed gear sleeve 12 is nested to a second shaft 14 via a spline, and they are fixedly connected via an end-face plate. The fixed gear sleeve 12 and the second shaft 14 are fixed in both of the axial direction and the circumferential direction; in other words, they do not have relative sliding or relative rotation therebetween. A second end cap 13 is provided on the outer side of the second shaft 14, and the fixed armature 10 is fixed to the second end cap 13.

The first shaft 4 is provided with a shaft pressing plate 3 at the front end, the shaft pressing plate 3 is connected to the movable gear sleeve 5 via a spring 2, and when the solenoid 11 is powered off, the elastic force of the spring 2 realizes the disengagement of the movable gear sleeve 5 and the fixed gear sleeve 12. The function of the shaft pressing plate 3 is to make the spring 2 always in a compressed state. As the clutch is disengaged and engaged, the amount of compression of the spring 2 varies, and the value of the elastic force also varies.

A solenoid 11 is wound inside the fixed armature 10, and the solenoid 11 when electrified can generate an electromagnetic force, which electromagnetic force, by cooperating with the spring 2, controls the engagement and disengagement between the fixed gear sleeve 12 and the movable gear sleeve 5.

A bearing 10 is nested to the outer circumference of the movable gear sleeve 5, the bearing 10 is embedded inside a bearing seat 7, the movable armature 8 is connected to the front end of the bearing seat 7, and the bearing seat 7 or the movable armature 8 is provided with a positioning surface at the rear end. The positioning surface of the bearing seat 7 or the movable armature 8 is positioned and abuts the first end cap 6, and the front end of the first end cap 6 is a vertical plane that cooperates with the positioning surface of the bearing seat 7 or the movable armature 8. In an embodiment of the present disclosure, the bearing seat 7 is provided with a positioning surface at the rear end.

Figure 4:
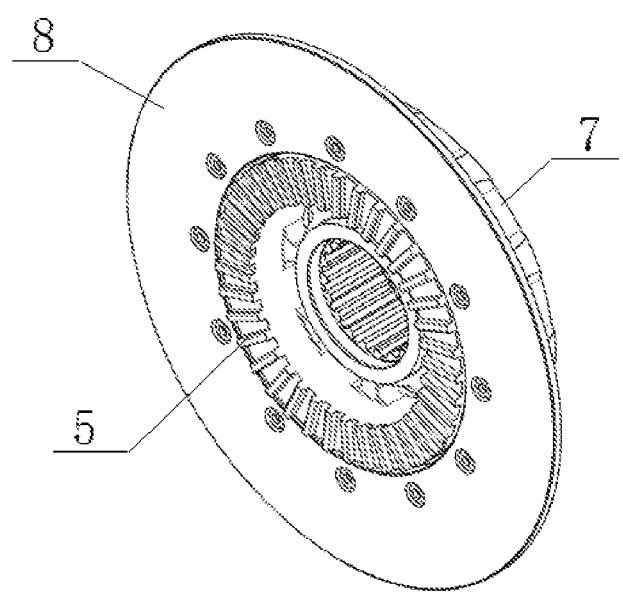
FIG. 4 is a schematic view of the assembling between the movable gear sleeve and the movable armature according to the present disclosure.

A bearing 10 is provided between the movable gear sleeve 5 and the movable armature 8, and the movable gear sleeve 5 and the movable armature 8 may rotate relatively. The bearing outer ring of the bearing 10 is mounted to the bearing seat 7, the bearing inner ring is mounted to the movable gear sleeve 5, and the bearing seat 7 is fastened to the movable armature 8 via a screw, as shown in FIG. 4.

Alternatively, the bearing seat 7 is fastened to the movable armature 8 via a rivet, which can improve the loose resistant performance, and increase the reliability of the entire clutching system.

The height of the positioning surface at the rear end of the bearing seat 7 is configured so that the gap between the movable armature 8 and the fixed armature 10 when disengaged is in the range of 2-8 mm.

The fixed armature 10 is provided with a cushioning component at an end face or the outer circumference. When the fixed armature 10 is attracted to the movable armature 8, the cushioning component serves to cushion, and leaves a gap between the fixed armature 10 and the movable armature 8.

The cushioning component is a cushioning gasket 9 provided on the end face or the outer circumference of the fixed armature 10, or a plurality of cushioning blocks provided circumferentially on the end face or the outer circumference of the fixed armature 10.

In an embodiment of the present disclosure, the cushioning gasket 9 is provided on the end face of the fixed armature 10 that is attracted to the movable armature 8. The cushioning gasket 9 is of an annular structure, and is embedded in an annular groove provided on the end face of the fixed armature 10. The cushioning gasket 9 is fixed in the annular groove of the fixed armature 10 by using a screw.

Alternatively, the cushioning gasket 9 is fixed in the annular groove of the fixed armature 10 by means of injection molding, which can improve the production efficiency, and increases the contact area between the cushioning gasket 9 and the fixed armature 10, which improves the cushioning performance of the cushioning gasket 9.

The height of the cushioning component is configured so that the gap between the movable armature 8 and the fixed armature 10 when attracted is in the range of 0.1-1.5 mm.

The cushioning gasket 9 mounted on the fixed armature 10, in one aspect, prevents the direct collision between the fixed armature 10 and the movable armature 8, and in another aspect, guarantees that the fixed armature 10 and the movable armature 8 have a certain gap therebetween when the fixed gear sleeve 12 and the movable gear sleeve 5 are engaged, which prevents that the fixed armature 10 and the movable armature 8, when abutted, cannot be disengaged due to remanence.

Figure 2:
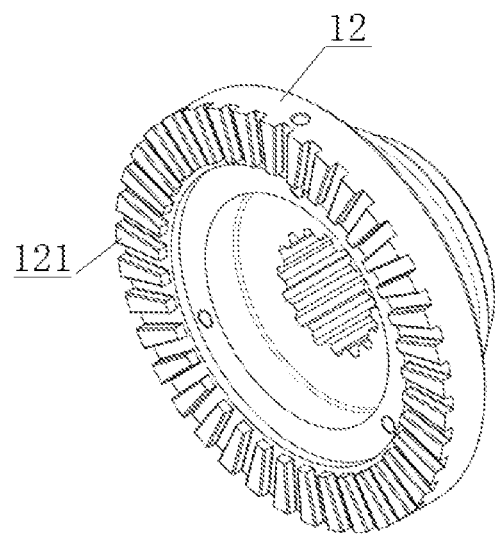
FIG. 2 is a schematic structural diagram of the fixed gear sleeve according to the present disclosure.
Figure 3:
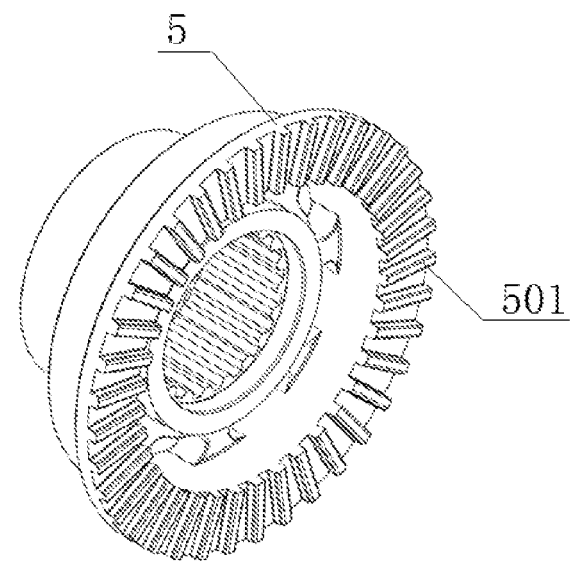
FIG. 3 is a schematic structural diagram of the movable gear sleeve according to the present disclosure.

As shown in FIGS. 2-3, both of the movable gear sleeve 5 and the fixed gear sleeve 12 are provided with contrate teeth; in other words, an end face of the movable gear sleeve 5 is provided with movable-gear-sleeve contrate teeth 501, and an end face of the fixed gear sleeve 12 is provided with fixed-gear-sleeve contrate teeth 121. When the movable-gear-sleeve contrate teeth 501 of the movable gear sleeve 5 and the fixed-gear-sleeve contrate teeth 121 of the fixed gear sleeve 12 are engaged, the addenda and the dedendal of the movable-gear-sleeve contrate teeth 501 and the fixed-gear-sleeve contrate teeth 121 have a gap therebetween, and the tooth sides of the movable-gear-sleeve contrate teeth 501 and the fixed-gear-sleeve contrate teeth 121 are in contact, at which point a moment can be transmitted. When the movable gear sleeve 5 and the fixed gear sleeve 12 are disengaged, the fixed-gear-sleeve contrate teeth 121 of the fixed gear sleeve 12 and the movable-gear-sleeve contrate teeth 501 of the movable gear sleeve 5 are not in contact.

Both of the axial positions of the fixed armature 10 and the cushioning gasket 9 are fixed and cannot be changed, and the axial positions of the movable armature 8 and the movable gear sleeve 5 are displaced axially as the solenoid 11 is electrified or not. The spring 2 is in a pre-compressed state, and when the solenoid 11 is being electrified, the electromagnetic force between the fixed armature 10 and the movable armature 8 is greater than the sum of the elastic force of the spring 2 and the friction between the movable gear sleeve 5 and the first shaft 4, which causes the movable gear sleeve 5 to move toward the fixed gear sleeve 12, to cause the movable gear sleeve 5 and the fixed gear sleeve 12 to be engaged. When the solenoid 11 is powered off, the electromagnetic force between the fixed armature 10 and the movable armature 8 disappears, and at this point, by the action of the elastic force of the spring 2, the movable gear sleeve 5 and the fixed gear sleeve 12 are disengaged.

When the clutch is in the disengaged state, the positioning surface of the bearing seat 7 abuts the first end cap 6 due to the pre-pressure of the spring 2, thereby defining the position of the movable armature 8 in the disengaged state, to cause the gap between the movable armature 8 and the fixed armature 10 when disengaged to be in the range of 3.6-4 mm. Such a gap guarantees that the solenoid 11, when electrified, enables the fixed armature 10 to have a sufficient attraction force, to quickly attract the movable armature 8. When the electromagnetic force generated by the solenoid 11 is greater than the elastic force of the spring 2 and the friction force between the movable gear sleeve 5 and the first shaft 4, the clutch converts from the disengaged state into an engaged state. In order to maintain the engaged state, it is required that the solenoid 11 is being electrified, and the generated electromagnetic force is greater than the spring force at the moment. In the engaged state, the cushioning gasket 9 and the movable armature 8 are closely abutted, to guarantee that the gap between the movable armature 8 and the fixed armature 10 when attracted is in the range of 0.3-0.5 mm. The present disclosure, by the accurate positioning between the movable armature and the end caps, enables the gap between the two armatures when the clutch is disengaged to be in a preset range, which guarantees that the clutch has a sufficient attraction force in clutch attraction, to realize quick attraction.

In the present disclosure, in clutch attraction, the cushioning gasket on the fixed armature and the movable armature are closely abutted, and the movable armature and the fixed armature do not have relative rotation therebetween, which prevents the problem of mutual friction. At the same time, the fixed gear sleeve and the movable gear sleeve are engaged, rotate synchronously, and transmit torque, and at this point, merely the tooth sides of the fixed-gear-sleeve contrate teeth and the movable-gear-sleeve contrate teeth are in contact, and the dedendal and the addenda are not in contact, which can prevent extra axial load generated by the electromagnetic force from acting on the first shaft and the second shaft, and reduce the load on the two shafts.

The present disclosure can be applied to electrically driving systems of new-energy vehicles, and is an electromagnetic clutching system that has a compact structure, has no auxiliary executing structure and can be conveniently operated. The system controls the transmission and disconnection of power torque. The present disclosure has a simple structure, and has a good performance in assembling and manufacturing.

The above are merely embodiments of the present disclosure, and are not limiting the protection scope of the present disclosure. Any modifications, equivalent substitutions, improvements and extensions that are made within the spirit and principle of the present disclosure should fall within the protection scope of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An electromagnetic jaw clutch, comprising a movable gear sleeve (5) and a fixed gear sleeve (12) that are in engagement transmission, wherein a fixed armature (10) is nested to an outer side of the fixed gear sleeve (12), the fixed armature (10) and the fixed gear sleeve (12) have a gap therebetween, and have a fixed position, a solenoid (11) is provided inside the fixed armature (10), a movable armature (8) is rotatably nested to an outer side of the movable gear sleeve (5), the movable armature (8) is movable along with the movable gear sleeve (5) in an axial direction, and when the solenoid (11) is electrified, the solenoid (11) attracts the movable armature (8) to the fixed armature (10), to cause the movable gear sleeve (5) and the fixed gear sleeve (12) to be engaged;

the fixed armature (10) is provided with a cushioning component at an end face or an outer circumference for, when the fixed armature (10) is attracted to the movable armature (8), serving to cushion and leaving a gap between the fixed armature (10) and the movable armature (8);

wherein the cushioning component is a cushioning gasket (9) provided on the end face or the outer circumference of the fixed armature (10), or a plurality of cushioning blocks provided circumferentially on the end face or the outer circumference of the fixed armature (10).

2. The electromagnetic jaw clutch according to claim 1, wherein a bearing (10) is nested to an outer circumference of the movable gear sleeve (5), the bearing (10) is embedded inside a bearing seat (7), the movable armature (8) is connected to the bearing seat (7), and the bearing seat (7) or the movable armature (8) is provided with a positioning surface at a rear end.

3. The electromagnetic jaw clutch according to claim 2, wherein the movable gear sleeve (5) and the fixed gear sleeve (12) are nested to a first shaft (4) and a second shaft (14) respectively via a spline, the movable gear sleeve (5) is movable in an axial direction of the first shaft (4), a first end cap (6) and a second end cap (13) are respectively provided at outer sides of the first shaft (4) and the second shaft (14), and the positioning surface of the bearing seat (7) or the movable armature (8) is positioned and abuts the first end cap (6).

4. The electromagnetic jaw clutch according to claim 3, wherein a front end of the first end cap (6) is a vertical plane that cooperates with the positioning surface of the bearing seat (7) or the movable armature (8).

5. The electromagnetic jaw clutch according to claim 3, wherein the first shaft (4) is provided with a shaft pressing plate (3) at a front end, and the shaft pressing plate (3) is connected to the movable gear sleeve (5) via a spring (2); and when the solenoid (11) is powered off, a spring force of the spring (2) causes the movable gear sleeve (5) and the fixed gear sleeve (12) to be disengaged.

6. The electromagnetic jaw clutch according to claim 2, wherein a gap between the movable armature (8) and the fixed armature (10) when disengaged is in a range of 2-8 mm.

7. The electromagnetic jaw clutch according to claim 1, wherein a height of the cushioning component is configured so that the gap between the movable armature (8) and the fixed armature (10) when attracted is in a range of 0.1-1.5 mm.

8. The electromagnetic jaw clutch according to claim 1, wherein both of the movable gear sleeve (5) and the fixed gear sleeve (12) are provided with contrate teeth, and when the movable gear sleeve (5) and the fixed gear sleeve (12) are engaged, addenda and dedendal of the contrate teeth have a gap therebetween, and moment transmission is realized by contact between tooth sides.

* * * * *